R. STOTT.
Sugar Mill Governor.
No. 23,724.
Patented April 19, 1859.
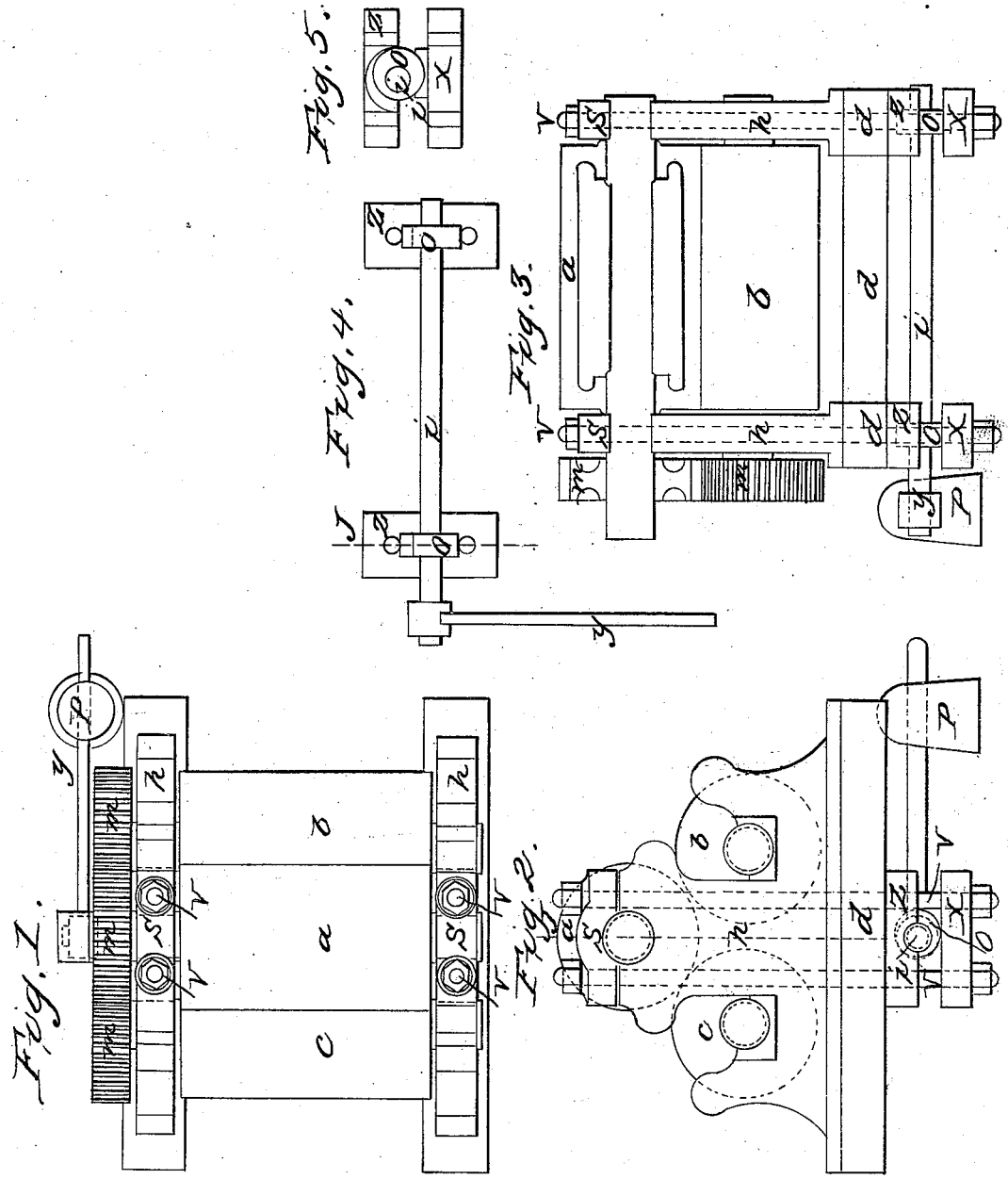
Witnesses:
Francis Armstrong
James Wallace

UNITED STATES PATENT OFFICE.

R. STOTT, OF BATON ROUGE, LOUISIANA.

IMPROVEMENT IN GOVERNORS FOR SUGAR-MILLS.

Specification forming part of Letters Patent No. 23,724, dated April 19, 1859.

*To all whom it may concern:*

Be it known that I, ROBERT STOTT, of the city of Baton Rouge, State of Louisiana, have made a new and useful Improvement in Governors for Sugar-Mills; and I hereby declare the following to be a full, clear, and exact description thereof, reference being had to the accompanying drawings, and to the letters of reference marked thereon, making a part of this specification, the same letters designating the same parts shown in the different figures.

Figure 1 is a top view; Fig. 2, a side elevation; Fig. 3, a sectional end elevation, taken from line $f$ through the housing and bed-plate, and the line $e$ through Fig. 2. Figs. 4 and 5 are made to define the mode of construction of the parts which, when in combination with the mill, produce the novelty.

I have omitted showing the sugar-mill in all its parts, as I do not consider this necessary to describe sufficient to instruct how to make and to use the subject of invention, the object of which is to secure a uniform pressure on the cane with variable feeding, this being attained from the action on the upper roller, all the parts to cause this action being set forth. The housings $h$ are mounted on the bed-plate $d$. The rollers $a\ b\ c$ are mounted in the housings. The caps for the upper rollers, S S, are held down by the bolts V, as usual; but instead of having these bolts take their bearings on the under side of the bed-plate, I extend them through the plates Z and X, and from the use of the eccentrics O, mounted on the bar $i$, that is actuated on by the weight P on lever Y, cause the caps S S to be held down by the force of the weight, which can yield in variable feeding and retain the upper roller with that force due to the force of the weight on the cane being ground; and should any substance get into the mill—for instance, an ax—which is of common occurrance, the weight can rise and allow it to pass out, and thus prevent the mill from being broken, which it must be when made rigid, or nearly so. The plate Z, as shown in Figs. 2 and 3, is placed on the under side of the bed-plates, and is made as shown by 4 and 5.

Fig. 4 shows it turned the lower side up, the bar $i$ having bearings on each side of the eccentrics O.

Fig. 5 is a sectional view of Z, taken from line $r$ in Fig. 4, showing the holes for the bolts to pass through, and a circular mortise to allow the eccentrics to move in. This figure shows the plate X, having a separate plate, $i'$, mounted on it, which has a part of a circle in its upper side for the eccentrics to move in, and extend the pressure over the surface of X to a greater extent than shown by the other figures, being loose from X, can slide with the movement of the eccentrics. Two weights can be used instead of one by the employment of another lever on the other end of bar $i$, made and arranged as the one shown. The gearing on the rollers is marked $m$.

The manner of attaching the power to the mill and the mode of working it apart from what has been stated, I consider unimportant. This arrangement can be made use of on the various forms of sugar-mills, and as a change of form may require modifications to suit the parts to be attached, which will be established by keeping in view the plan of application.

I do not claim, broadly, the use of a weight when acting through eccentric movements to secure a uniform force and allow the subject to move under that force; but

I claim—

In combination, the caps S S, the bolts V, the plates X and Z, when actuated by the employment of a weight, or its equivalent, through an eccentric movement, when made and arranged substantially as and for the purpose set forth.

R. STOTT.

Witnesses:
 FRANCIS ARMSTRONG,
 JAMES WALLACE.